US012737227B2

(12) United States Patent
Zhang et al.

(10) Patent No.: US 12,737,227 B2
(45) Date of Patent: Sep. 15, 2026

(54) DYNAMIC ALLOCATION OF SHARED MEMORY AMONG MULTIPLE THREADS VIA USE OF A DYNAMICALLY CHANGING MEMORY THRESHOLD

(71) Applicant: INTERNATIONAL BUSINESS MACHINES CORPORATION, Armonk, NY (US)

(72) Inventors: Ying Zhang, Beijing (CN); Sheng Yan Sun, Beijing (CN); Peng Hui Jiang, Beijing (CN); Xiao Xiao Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 18/343,000

(22) Filed: Jun. 28, 2023

(65) Prior Publication Data

US 2025/0004837 A1 Jan. 2, 2025

(51) Int. Cl.
*G06F 9/50* (2006.01)
*G06F 12/14* (2006.01)

(52) U.S. Cl.
CPC .......... *G06F 9/5016* (2013.01); *G06F 9/5005* (2013.01); *G06F 9/5033* (2013.01); *G06F 12/1441* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 9,152,549 | B1 * | 10/2015 | Kesselman | G06F 12/0253 |
| 12,321,389 | B1 * | 6/2025 | Tanase | G06F 16/9024 |
| 2009/0113433 | A1 * | 4/2009 | Dunshea | G06F 9/5022 718/102 |
| 2014/0059571 | A1 * | 2/2014 | Watson | G06F 9/5022 719/328 |

(Continued)

*Primary Examiner* — Abu Zar Ghaffari
(74) *Attorney, Agent, or Firm* — CHIP LAW GROUP

(57) ABSTRACT

A method, computer program product, and computer system for dynamically allocating shared memory among multiple execution threads via use of a dynamically changing memory threshold. A trained machine learning model (MLM) is executed to calculate the memory threshold ($M_{TH}$) using values of one or more input parameters as input to the MLM. After executing the MLM, a request is received from a requesting execution thread for a requested amount ($M_R$) of the shared memory. In response to the request, the shared memory is distributed among one or more current execution threads currently using the shared memory and the requesting execution thread. The redistributing is performed as a function $M_{TH}$, $M_R$, $M_U$, and $M_C$, wherein $M_U$ is a total amount of the shared memory currently being used by the one or more current execution threads, and wherein $M_C$ is a memory capacity of the shared memory.

8 Claims, 7 Drawing Sheets

(56) References Cited

U.S. PATENT DOCUMENTS

| | | | | |
|---|---|---|---|---|
| 2015/0149514 | A1 | 5/2015 | Kim | |
| 2016/0098345 | A1* | 4/2016 | Cho | G06F 12/023 711/170 |
| 2018/0276042 | A1* | 9/2018 | Toal | G06F 11/3037 |
| 2019/0050261 | A1 | 2/2019 | Schmisseur | |
| 2019/0087229 | A1* | 3/2019 | Luliano | G06F 9/544 |
| 2019/0354413 | A1 | 11/2019 | Bivens | |
| 2019/0384658 | A1* | 12/2019 | Maeda | G06F 9/544 |
| 2022/0035679 | A1* | 2/2022 | Sunwoo | G06N 3/09 |
| 2022/0058057 | A1* | 2/2022 | Lu | G06F 9/5016 |
| 2022/0066827 | A1 | 3/2022 | Tavallaei | |
| 2023/0036737 | A1* | 2/2023 | Carbon-Ogden | G06N 3/0475 |

* cited by examiner

DYNAMIC ALLOCATION OF SHARED MEMORY AMONG MULTIPLE THREADS VIA USE OF A DYNAMICALLY CHANGING MEMORY THRESHOLD

BACKGROUND

The present invention relates to allocation of shared memory, and more specifically to dynamic allocation of shared memory among multiple threads via use of a dynamically changing memory threshold.

SUMMARY

Embodiments of the present invention provide a method, a computer program product, and a computer system, for dynamically allocating shared memory among multiple execution threads via use of a dynamically changing memory threshold.

One or more processors of a computer system execute a trained machine learning model (MLM) to calculate the memory threshold ($M_{TH}$) using values of one or more input parameters as input to the MLM. The MLM was previously trained based on the one or more input parameters.

After executing the MLM, the one or more processors receive a request from a requesting execution thread for a requested amount ($M_R$) of the shared memory.

In response to the request, the one or more processors redistribute the shared memory among one or more current execution threads currently using the shared memory and the requesting execution thread. The redistributing is performed as a function $M_{TH}$, $M_R$, $M_U$, and $M_C$, wherein $M_U$ is a total amount of the shared memory currently being used by the one or more current execution threads, and wherein $M_C$ is a memory capacity of the shared memory.

DETAILED DESCRIPTION

Figure 1:
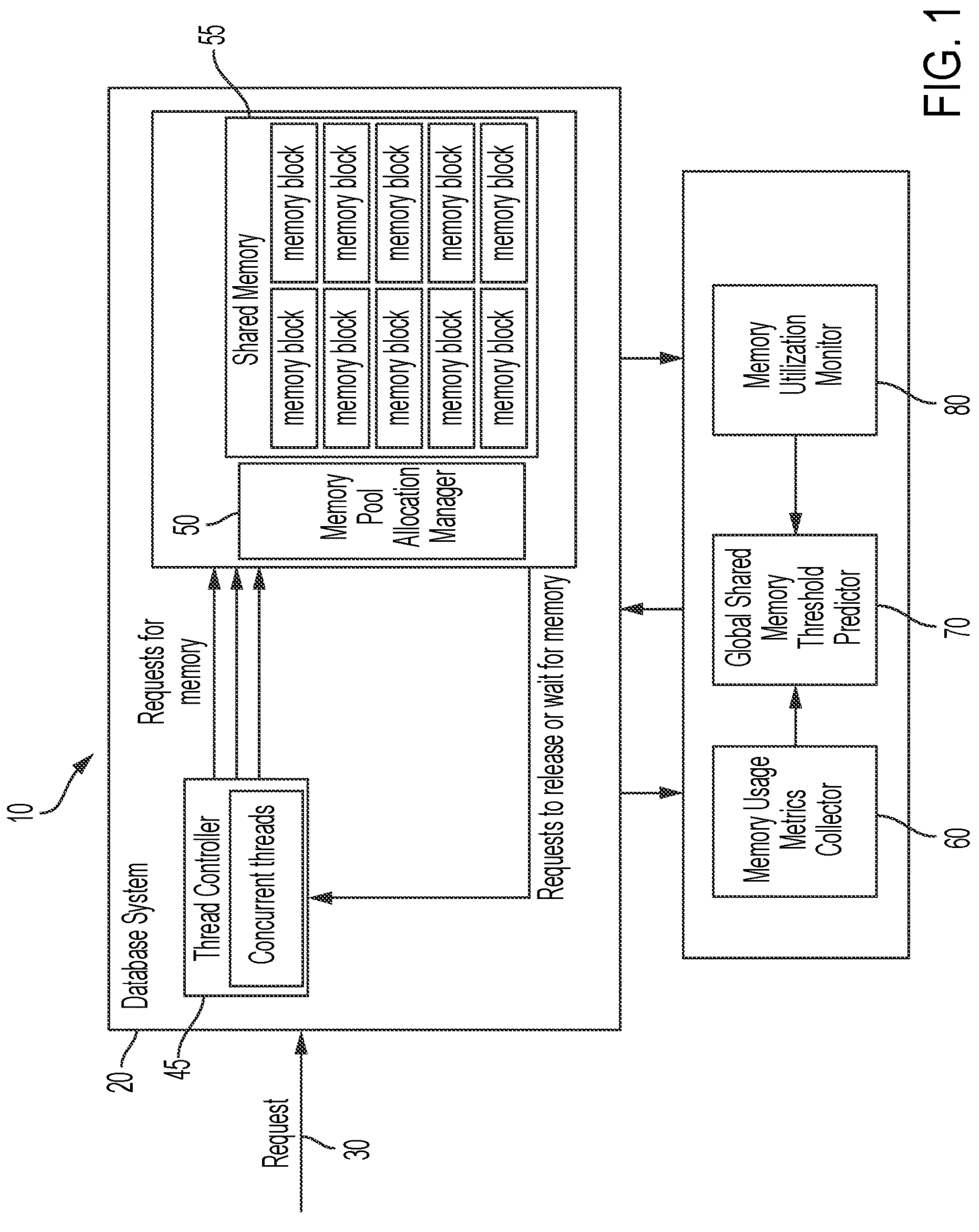
FIG. 1 depicts an architecture that includes a database system for implementing allocation of shared memory, in accordance with embodiments of the present invention.

A memory pool is a shared memory that is commonly used to allocate and initialize memory in advance of the usage of the memory. The memory allocation is usually a fixed size of memory and is shared among execution threads. When an execution thread requests a certain memory resource, the requesting execution thread can get the certain memory resource directly from the memory pool instead of being allocated the memory resource by an operating system (OS). When the requesting execution thread finishes using the allocated memory resource, the memory resource is returned to the memory pool instead of being destroyed. The requesting execution thread can usually get as much memory as needed as long as the memory pool can fulfill the memory resource request. However, since the memory pool is shared by multiple execution threads, when the concurrency of execution threads using the memory pool is high, there may not be enough shared memory left in the memory pool to fulfill all concurrent requests, and some execution threads would fail to obtain any memory resource resulting in a processing failure, which would in turn cause performance degradation or even job failure. Such job failure is caused by memory pool shortage due to high concurrency of execution threads which might cause serious throughput problems during hours when computer usage is high.

The following scenario illustrates a problem solved by embodiments of the present invention. Concurrency of execution threads is extremely high on Monday mornings. For example, a few execution threads are running large queries, which holds up to thousands of memory blocks. Some execution threads for queries, which would originally complete quickly, end up taking hours to complete because of an inefficient execution path, or because of being cancelled eventually due to not being able to obtain any memory at all which increases memory lock because memory blocks being held for a longer time due to a longer elapsed time. Thus, the whole throughput on Monday morning is seriously affected.

Embodiments of the present invention generate and use a dynamically determined memory threshold to manage a shared memory pool in a distributed database system.

For example, the memory threshold may be set to a high value (e.g., up to 80%, or even 100% of the total memory) when the concurrent workloads are all large batch jobs, and when the concurrency is low during the night hours.

For example, the memory threshold may be set to a low value (e.g., down to 50% of the total memory, or even lower) when the concurrency is high during busy computer usage hours and when the concurrent workloads are all small ad-hoc jobs.

With embodiments of the present invention, if the total amount of memory used is under the memory threshold, any execution thread requesting memory can get as much memory as is requested, provided that provision of the requested memory does not cause the memory capacity of the shared memory pool to be exceeded.

With embodiments of the present invention, if the total amount of memory used reaches the memory threshold, only new threads requesting memory can be provided with a pre-determined minimum number of memory blocks, to allow the job to be started.

Embodiments of the present invention use a Memory Pool Release Manager Extension to proactively release memory in execution threads when the total amount of memory used reaches the memory threshold. Candidates selected from the existing execution threads who are holding memory blocks may be requested to release memory. Such candidates may be the top N execution threads holding the most amount of memory or the top N execution threads holding memory for the longest time. The candidates are requested to pause their process, consume what's already in the memory blocks, and release those memory blocks and then resume their work again.

Embodiments of the present invention generate and use a dynamically determined memory threshold to manage a shared memory pool in distributed database system. The dynamically determined memory threshold is generated via a trained machine learning model (MLM) that was trained from training data comprising historical data of one or more input parameters as input and associated memory threshold output. The memory threshold output of the training data is the shared memory being used at the values of the training data input parameters.

As the MLM is being trained, the MLM iteratively adjusts the input parameters of the MLM to enable the MLM to learn, with continuously improved accuracy, how to calculate or predict the memory threshold, until the MLM satisfies predetermined or specified accuracy criteria for the calculated or predicted memory threshold.

After the MLM is trained, the MLM is tested for accuracy using test data of the input parameters that differs from the training data previously used to train the MLM.

After a successful testing of the MLM, the MLM is considered to be sufficiently trained for subsequent usage to predict or calculate the memory threshold in accordance with embodiments of the present invention.

Based on the historical data, attributes of concurrent workloads, busy computer usage hours, etc., the MLM uses a global shared memory threshold predictor module 70 (see FIG. 1) to determine the dynamic threshold.

Known machine learning models that are all good candidates for dynamically determining or predicting the memory threshold include, inter alia, linear regression, logistic regression, decision tree, Support Vector Machines (SVM), Naive Bayes algorithm, K-Nearest Neighbors (KNN), K-means Clustering, and Time Series Forecasting Models.

Input parameters for the MLM may include at least one of, inter alia, (i) workload attributes (e.g., average execution time, average memory usage and/or average memory holding time by an execution thread); (ii) historical data (e.g., total memory usage at different time periods of a day or a week or a month (e.g., time of day during a work day and (iii) a time of day during a non-work day) and/or typical busy computer usage hours); and runtime parameters (e.g., total number of concurrent execution threads and/or total amount of memory used).

For example, a KNN algorithm has C classes into which the memory threshold could be classified for a given set of input parameters, wherein C is at least 2 (e.g., C=2, 3, 4, etc.). The KNN algorithm determines K nearest neighbors between the given set of input parameters and datasets of points in each of the C classes, and votes for the class having more nearest neighbors than does any other class, wherein the nearest neighbors are determined via calculation of distances (e.g., Euclidean distance, Manhattan distance, etc.) between the given set of input parameters and each point in the datasets of points in each of the 4 classes.

For example, with C=4, the 4 classes could be memory thresholds of 0.20, 0.40, 0.60, and 0.80, and the KNN algorithm would determine, for a given set of input parameters, whether to output (i.e., classify) the memory threshold as 0.20, 0.40, 0.60, and 0.80.

In one embodiment with KNN, the KNN algorithm could classify the memory threshold into ranges of continuously varying memory threshold, wherein the KNN algorithm first selects one of the ranges and then determines a specific value of memory threshold within the selected range via random selection of a random number from a uniform probability distribution.

For example, with C=3, the ranges of the memory threshold ($M_{TH}$) could be: first range of $0.05<M_{TH}\leq 0.35$, second range of $0.35<M_{TH}\leq 0.65$, and third range of $0.65<M_{TH}\leq 0.95$. If the KNN algorithm selects the second range, then the KNN algorithm would randomly select a random value of $M_{TH}$ in the second range from a uniformly distributed probability distribution.

Although the preceding discussion of MLM was illustrated by a KNN model, any applicable MLM could be used in an analogous manner in terms of the specific characteristics and features of the applicable MLM.

FIG. 1 depicts an architecture 10 that includes a database system 20 for implementing allocation of shared memory 55, in accordance with embodiments of the present invention.

The database system 20, which includes a database thread controller 45, a memory pool allocation manager 50 and the shared memory 55, processes an incoming request 30 by a requesting execution thread for an amount ($M_R$) of the shared memory 55.

The memory pool allocation manager 50 manages distribution of the shared memory 55 among current execution threads in dependence on the memory threshold. Current execution threads (or existing execution threads) are defined as execution threads currently and concurrently using respective portions of the shared memory 55. The memory pool allocation manager 50 also proactively releases some of the shared memory used by existing execution threads when a total amount of shared memory used reaches the memory threshold.

A global shared memory threshold predictor 70 is a machine learning model (MLM) that calculates or predicts the dynamically determined memory threshold as described supra.

To alleviate job failure due to the requesting execution thread (if being a new execution thread) not being able to get any of the requested shared memory $M_R$, the database thread controller 45 proactively triggers the new execution thread to wait for shared memory when existing execution threads have already been required to release shared memory if, inter alia, the total amount of memory has been used up under high concurrency of existing execution threads, The memory utilization monitor 80 monitors utilization of the shared memory 55 by execution threads.

The memory usage metrics collector 60 collects and stores metrics that include values of input parameters used for calculating the memory threshold.

Figure 2:
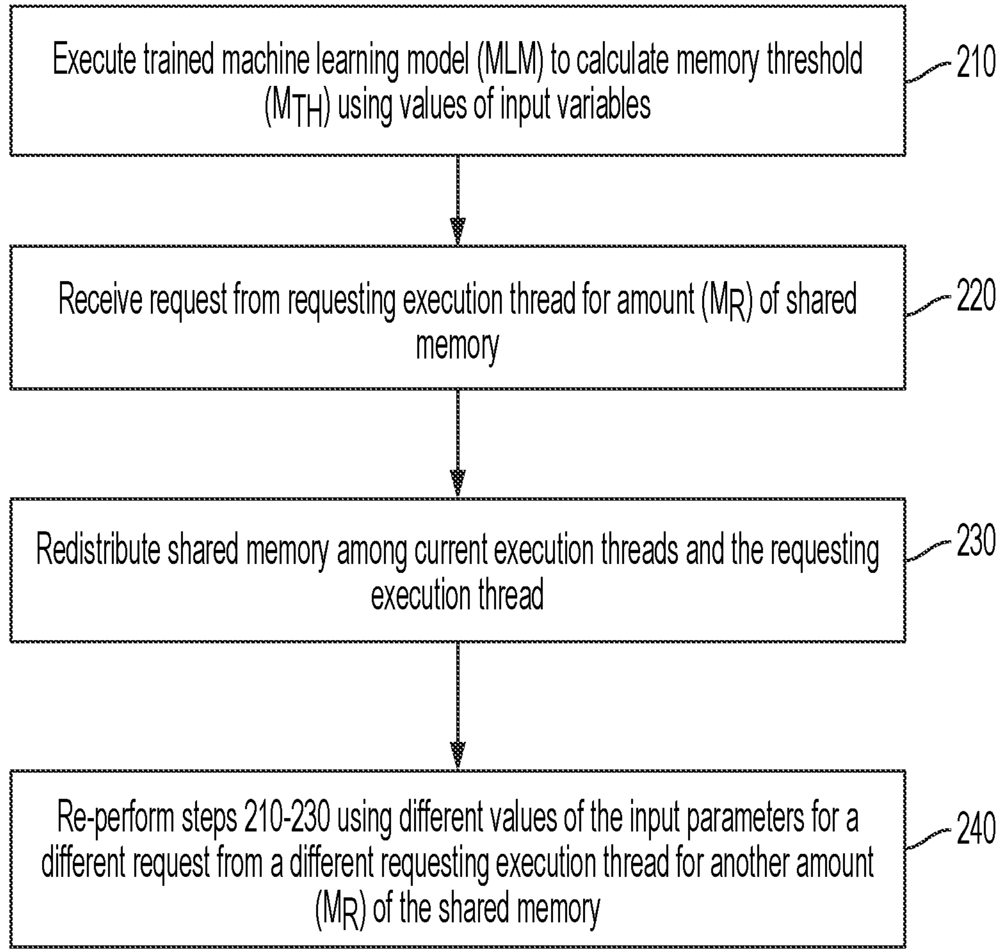
FIG. 2 is a flow chart of a method for dynamically allocating shared memory among multiple execution threads via use of a dynamically changing memory threshold, in accordance with embodiments of the present invention.

FIG. 2 is a flow chart of a method for dynamically allocating shared memory among multiple execution threads via use of a dynamically changing memory threshold, in accordance with embodiments of the present invention. The flow chart of FIG. 1 includes steps 210-240.

The parameters of $M_{TH}$, $M_R$, $M_U$, $M_{MIN}$, $M_C$, and $M_N$ are relevant to the method described by the method of FIG. 2.

$M_{TH}$ is the memory threshold.

$M_R$ is a requested amount of the shared memory by a requesting execution thread.

$M_U$ is a total amount of the shared memory currently being used by the one or more current execution threads.

$M_{MIN}$ is a predetermined minimum amount of shared memory.

$M_C$ is a memory capacity of the shared memory.

$M_N$ is shared memory currently used by N top execution threads, wherein the N top execution threads are those existing execution threads that hold a most amount of shared memory or hold shared memory for a longest period of time.

Step 210 executes a trained machine learning model (MLM) to calculate a memory threshold ($M_{TH}$) value using values of one or more input parameters as input to the MLM, wherein the MLM was previously trained based on the one or more input parameters.

After the MLM has been executed, step 220 receives a request from a requesting execution thread for a requested amount ($M_R$) of the shared memory.

In response to the request for the amount $M_R$ of shared memory, step 230 redistributes the shared memory among one or more current execution threads currently using the shared memory and the requesting executed thread. The redistributing is performed as a function of $M_{TH}$, $M_R$, $M_U$, and $M_C$, wherein $M_U$ is a total amount of the shared memory currently being used by the one or more current execution threads, and wherein $M_C$ is a memory capacity of the shared memory. The memory capacity $M_C$ is an upper limit of the shared memory.

After execution of steps 210-230, step 240 re-performs steps 210-230 using different values of the one or more input parameters resulting in a change in the calculated memory threshold $M_{TH}$ in re-performed step 210, wherein the request from the requesting execution thread in re-performed step 220 is replaced by a different request from a different requesting execution thread for another amount ($M_R$) of the shared memory, and wherein the redistributed shared memory has changed in re-performed step 230.

Figure 3:
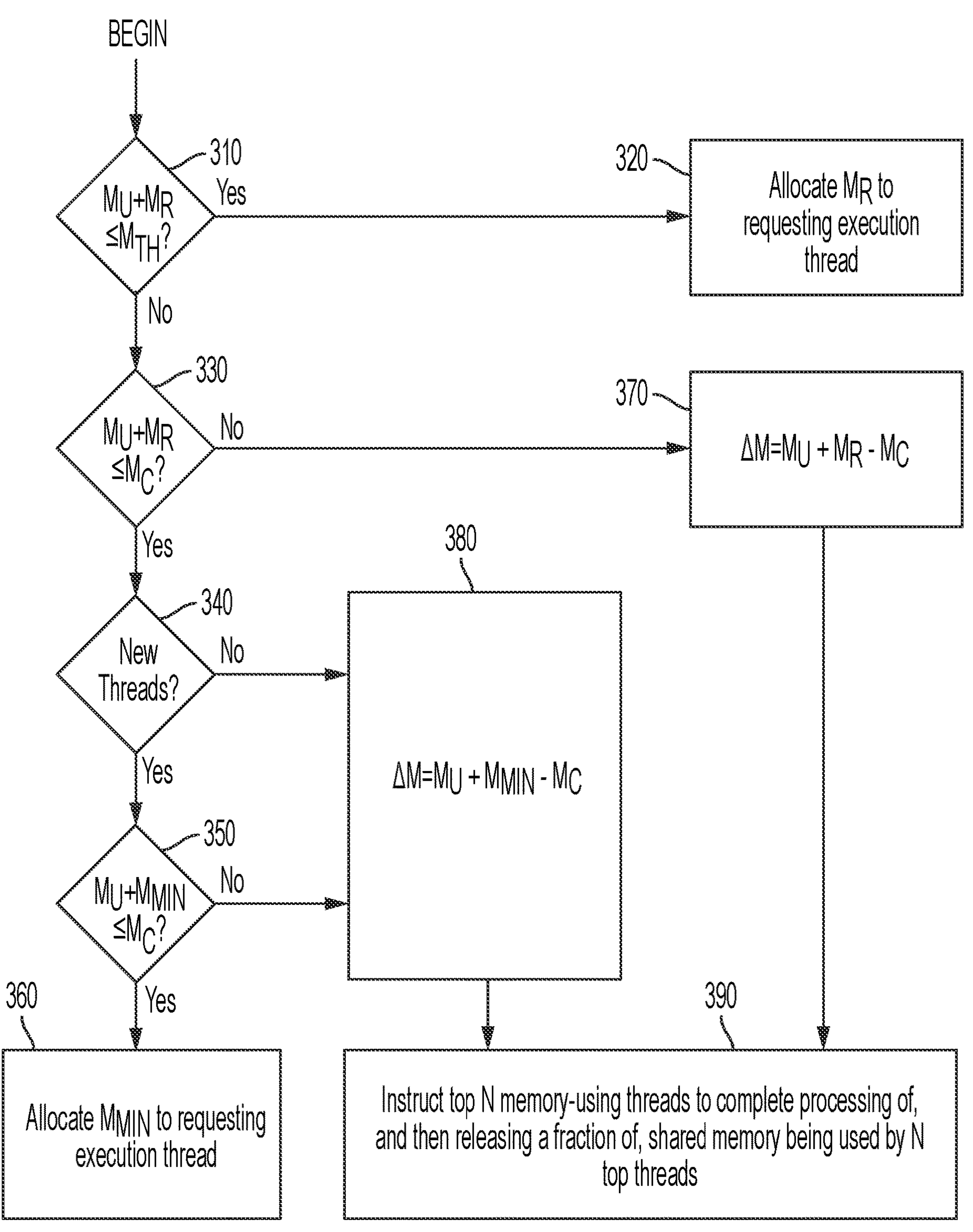
FIG. 3 is a flow chart that describes a process of redistributing shared memory, in accordance with embodiments of the present invention.

FIG. 3 is a flow chart that describes a process of redistributing shared memory, in accordance with embodiments of the present invention. The flow chart of FIG. 3, which describes step 230 of FIG. 2 in more detail, includes steps 310-390.

The process of FIG. 3 attempts to keep the total allocated shared memory at or below the memory threshold ($M_{TH}$) and allows only a new execution thread to be allocated shared memory above the memory threshold ($M_{TH}$) but only under limited circumstances, and constrains total allocated shared memory to not exceed the memory capacity ($M_C$) of the shared memory.

Step 310 determines whether $M_U+M_R \leq M_{TH}$ and if so then step 320 is next executed, and if not then step 330 is next executed.

Step 320 allocates the requested $M_R$ of shared memory to the requesting execution thread.

Step 330 determines whether $M_U+M_R \leq M_C$ and if not then step 370 is next executed, and if so then step 340 is next executed.

Step 370 calculates $\Delta M=M_U+M_R-M_C$ followed by execution of step 390. The calculated ΔM in step 370 is an amount of memory by which $M_U+M_R$ exceeds $M_C$ which is subsequently released in step 390.

Step 340 determines whether the requesting execution thread is a new execution thread and if not then step 380 is next executed, and if so then step 350 is next executed.

Step 350 determines whether $M_U+M_{MIN} \leq M_C$ and if not then step 380 is next executed, and if so then step 360 is next executed.

Step 360 allocates shared memory $M_{MIN}$ to the requesting execution thread.

Step 380 calculates $\Delta M=M_U+M_{MIN}-M_C$. The calculated ΔM in step 380 is an amount of memory by which $M_U+M_{MIN}$ exceeds $M_C$ which is subsequently released in step 390.

Step 390 instructs N top execution threads to complete processing of, and then releasing of, a fraction (f) of the shared memory currently used ($M_N$) by the N top execution threads, wherein the N top execution threads are those existing execution threads that hold a most amount of shared memory or hold shared memory for a longest period of time. The N top execution threads do not include the requesting execution thread. N and f are constrained to satisfy a constraint of $f*M_N \geq \Delta M$, and wherein $0<f\leq 1$ and N is a positive integer of at least 1 (e.g., N=1, 2, 3, etc.). The constraint of $f*M_N \geq \Delta M$ provides assurance that the amount of shared memory ΔM that needs to be released will actually be released.

In one embodiment, f is predetermined or previously specified, wherein the instructing of the N top execution threads comprises: calculating $M_N=\Delta M/f$; and calculating $N=\text{Floor}(M_N)$, wherein Floor(x) is defined as a highest integer less than or equal a real number x.

In one embodiment, N is predetermined or previously specified, wherein the instructing of the N top execution threads comprises: calculating $f=\Delta M/N$.

Figure 4:
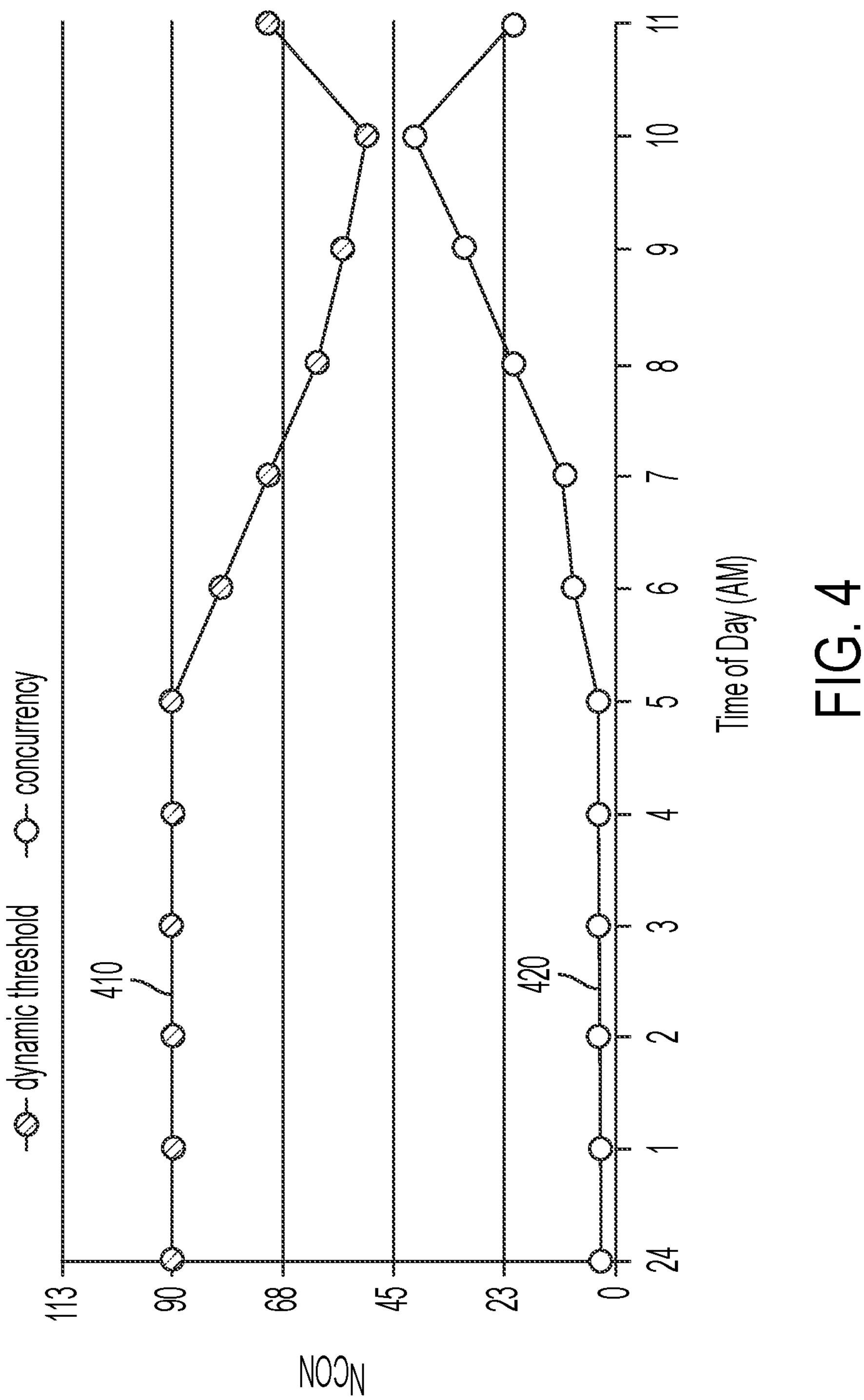
FIG. 4 depicts a graph of a dynamic memory threshold and number of concurrent execution threads versus time of day, in accordance with embodiments of the present invention.

FIG. 4 depicts a graph of a dynamic memory threshold 410 and number of concurrent execution threads 420 versus time of day, in accordance with embodiments of the present invention.

The listed values of the number ($N_{CON}$) of concurrent execution threads 420 (i.e., values 0, 23, 45, 68, 90, 113) are listed explicitly, and the values of the dynamic memory threshold 410 are inferred as listed $N_{CON}/100$. For example, at Time of Day 3 AM, the dynamic memory threshold is 0.90 (i.e., 90/100).

FIG. 4 depicts a negative correlation between the dynamic memory threshold and the number of concurrent execution threads, which supports use of and the number of concurrent execution threads as an input parameter for calculating or predicting the dynamic memory threshold by the MLM.

Figure 5:
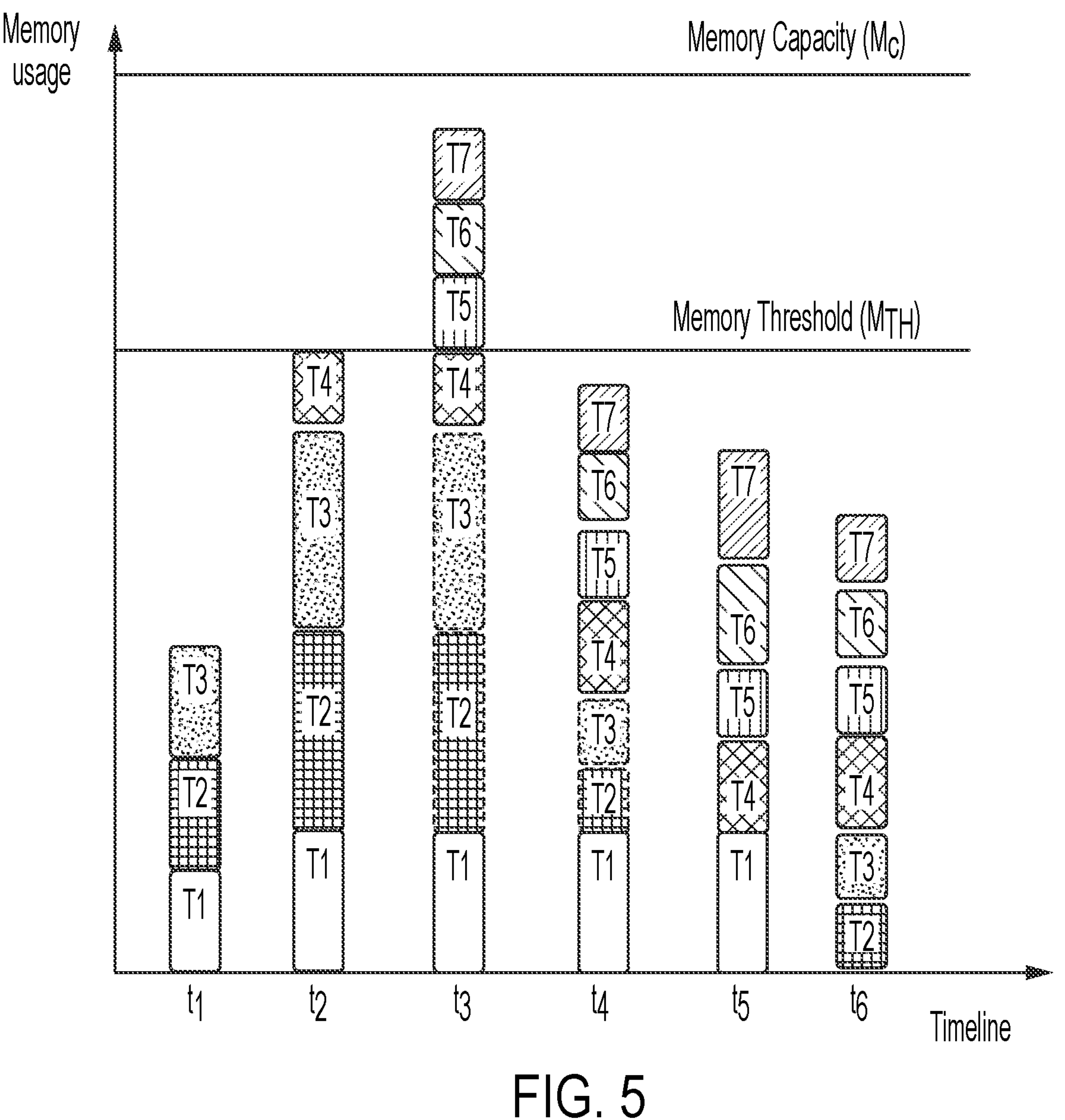
FIG. 5 depicts an example of changing memory usage by multiple execution threads over time, in accordance with embodiments of the present invention.

FIG. 5 depicts an example of changing memory usage by multiple execution threads over time, in accordance with embodiments of the present invention.

In FIG. 5, the memory usage by different execution threads is shown at times t1, t2, t3, t4, t5 and t6.

At time t1, the shared memory collectively used by execution threads T1, T2 and T3 is below the memory threshold $M_{TH}$.

At time t2, execution threads T1, T2 and T3 are using increased amounts shared memory and a new execution thread T4 has been added, wherein the shared memory collectively used by execution threads T1, T2, T3 and T4 is at the memory threshold $M_{TH}$.

At time t3, shared memory by execution threads T1, T2, T3 and T4 is unchanged, and new execution threads T5, T6 and T7 have been added, wherein the shared memory collectively used by execution threads T1, T2, T3, T4, T5, T6 and T7 is above the memory threshold $M_{TH}$ and below the memory Capacity $M_C$.

At time t4, execution threads T2 and T3 have released a fraction of their held shared memory and execution thread T4 has increased its shared memory usage, wherein the shared memory collectively used by execution threads T1, T2, T3, T4, T5, T6 and T7 is below the memory threshold $M_{TH}$.

At time t5, execution threads T2 and T3 have completed their usage of shared memory, wherein the shared memory collectively used by remaining execution threads T1, T4, T5, T6 and T7 is below the memory threshold $M_{TH}$.

At time t6, execution thread T1 has completed its usage of shared memory, execution thread T3 is again using shared memory, and execution threads T4, T5, T6 and T7 are shown with current shared memory usage, wherein the shared memory collectively used by execution threads T2, T3, T4, T5, T6 and T7 is below the memory threshold $M_{TH}$.

Figure 6:
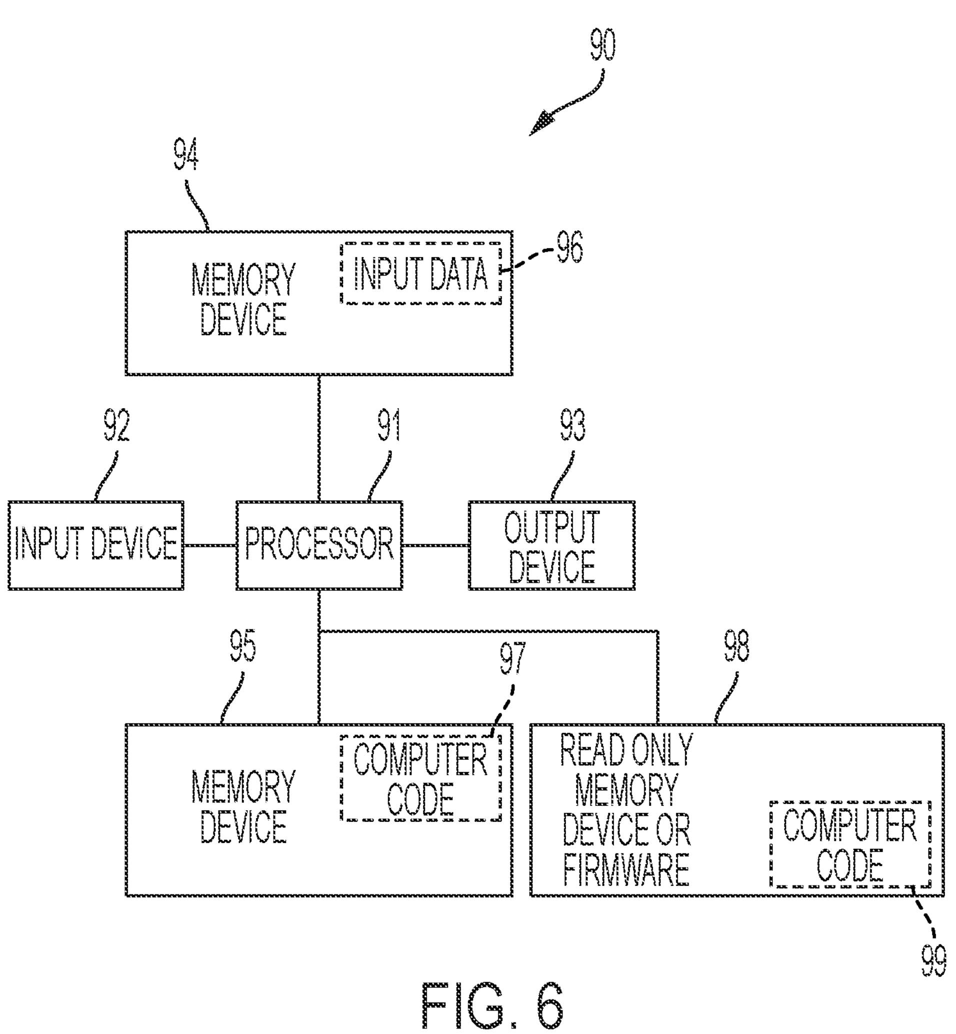
FIG. 6 illustrates a computer system, in accordance with embodiments of the present invention.

FIG. 6 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
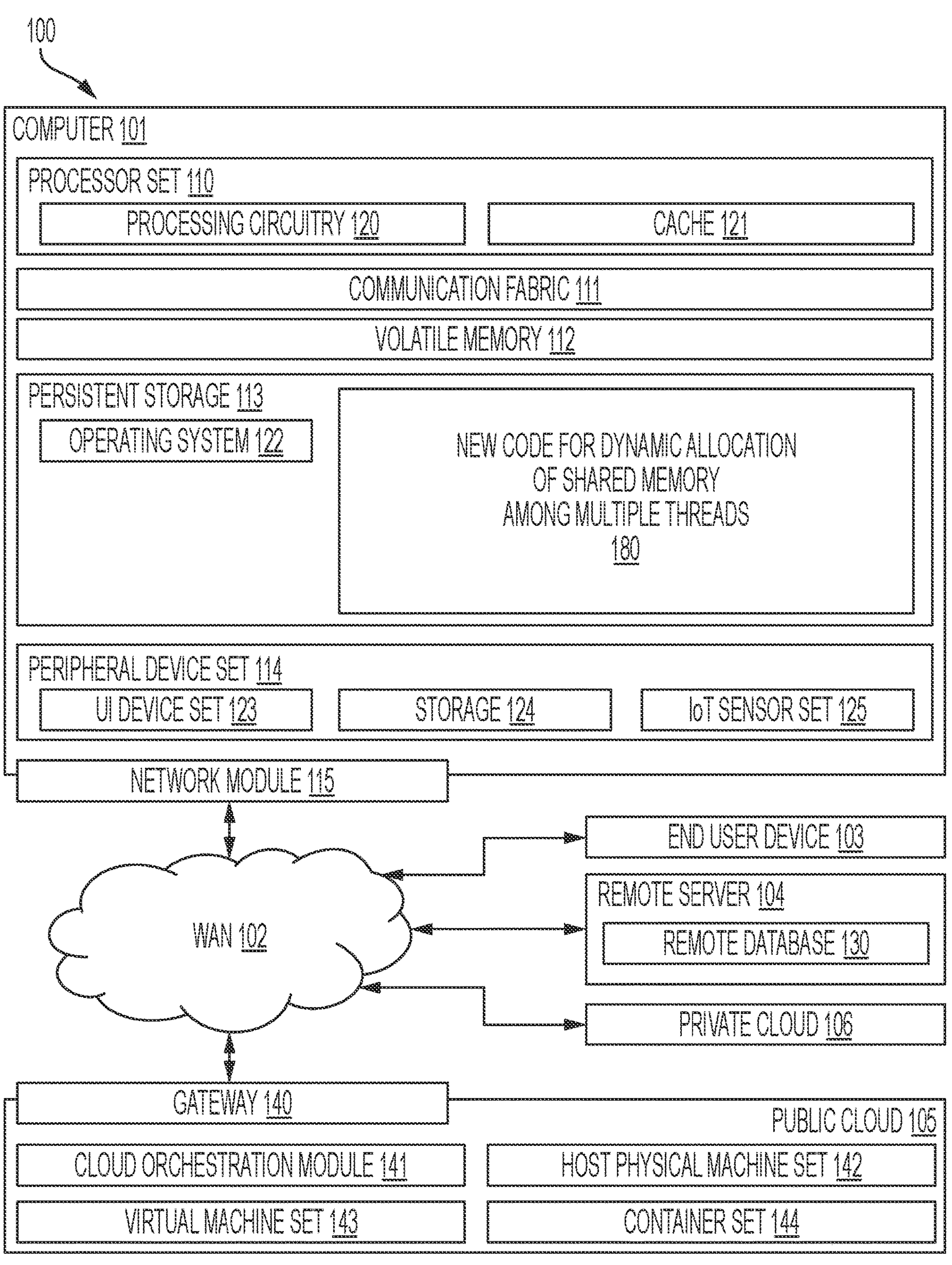
FIG. 7 depicts a computing environment which contains an example of an environment for the execution of at least some of the computer code involved in performing the inventive methods, in accordance with embodiments of the present invention.

FIG. 7 depicts a computing environment 100 which contains an example of an environment for the execution of at least some of the computer code involved in performing the inventive methods, in accordance with embodiments of the present invention. Such computer code includes new code for dynamic allocation of shared memory among multiple threads 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 7. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically allocating shared memory of a computer system among multiple execution threads via use of a memory threshold, said computer-implemented method comprising steps of:

(a) executing, by one or more processors of the computer system, a trained machine learning model (MLM) to calculate a memory threshold ($M_{TH}$) of the shared memory using values of one or more input parameters as input to the MLM, wherein said MLM is previously trained based on the one or more input parameters;

(b) after said executing the MLM, receiving, by the one or more processors, a request from a requesting execution thread for a first requested amount ($M_R$) of the shared memory, wherein:

the requesting execution thread is one of a new execution thread or an existing execution thread, the existing execution thread is using a first portion of the shared memory, and the new execution thread requests for a second portion of the shared memory; and (c) redistributing, in response to the request, by the one or more processors, the shared memory among one or more current execution threads currently using the shared memory and the requesting execution thread, wherein:

said redistributing is performed as a function of $M_{TH}$, $M_R$, $M_u$, and $M_c$, $M_u$ is a total amount of the shared memory currently being used by the one or more current execution threads, and $M_c$ is a memory capacity of the shared memory, and said redistributing in step (c) comprises steps of:

(c1) determining whether $M_u+M_R \leq M_{TH}$, wherein in a case where $M_u+M_R \leq M_{TH}$, allocating the first requested amount $M_R$ of the shared memory to the requesting execution thread, and in a case where $M_u+M_R > M_{TH}$, then performing step (c2);

(c2) determining, based on the $M_u+M_R > M_{TH}$, whether $M_u+M_R \leq M_c$, wherein in a case where $M_u+M_R > M_c$, then setting $\Delta M=M_U+M_R-M_c$ followed by step (c5), and in a case where $M_u+M_R \leq M_c$, then performing step (c3);

(c3) determining, based on the $M_u+M_R \leq M_c$, whether the request is from a new requesting thread and $M_U+M_{min} \leq M_c$, wherein in a case where the request is from the new requesting thread and $M_u+M_{min} \leq M_c$, then performing step (c4), in a case where the requesting execution thread is the existing execution thread, setting $\Delta M=M_U+M_{MIN}-M_c$ followed by performing step (c5), and $M_{MIN}$ is a predetermined minimum amount of the shared memory;

(c4) allocating the predetermined minimum amount of shared memory $M_{MIN}$ to the requesting execution thread; and (c5) instructing, based on the determination that the requesting execution thread is the existing execution thread and the setting of $\Delta M=M_U+M_{MIN}-M_c$, N top execution threads to complete processing of, and then releasing of, a fraction (f) of the shared memory currently used ($M_N$) by the N top execution threads, wherein the N top execution threads are existing execution threads that hold a most amount of the shared memory or hold the shared memory for a longest period of time, the N top execution threads do not include the requesting execution thread, f and N are constrained to satisfy $f*M_N \geq \Delta M$, and $0<f \leq 1$ and N is a positive integer of at least 1, N is predetermined or previously specified, and said instructing comprises calculating $f=\Delta M/N$.

2. The computer-implemented method of claim 1, said computer-implemented method further comprising the steps of:

re-performing steps (a)-(c), after execution of steps (a)-(c), using different values of the one or more input parameters, resulting in a change in the calculated memory threshold $M_{TH}$ in re-performed step (a), wherein the request from the requesting execution thread in re-performed step (b) is replaced by a different request from a different requesting execution thread for a second requested amount ($M_R$) of the shared memory, and the redistributed shared memory has changed in re-performed step (c).

3. The computer-implemented method of claim 1, wherein the N top execution threads are those existing execution threads that hold the most amount of the shared memory.

4. The computer-implemented method of claim 1, wherein the N top execution threads are those existing execution threads that hold the shared memory for the longest period of time.

5. A computer program product, comprising one or more computer readable hardware storage devices having computer readable program code stored therein, said computer readable program code containing instructions executable by one or more processors of a computer system to implement a method for dynamically allocating shared memory of the computer system among multiple execution threads via use of a memory threshold, said method comprising:

(a) executing, by the one or more processors, a trained machine learning model (MLM) to calculate a memory threshold ($M_{TH}$) of the shared memory using values of one or more input parameters as input to the MLM, wherein said MLM is previously trained based on the one or more input parameters;

(b) after said executing the MLM, receiving, by the one or more processors, a request from a requesting execution thread for a first requested amount ($M_R$) of the shared memory, wherein:

the requesting execution thread is one of a new execution thread or an existing execution thread, the existing execution thread is using a first portion of the shared memory, and the new execution thread requests for a second portion of the shared memory; and (c) in response to the request, redistributing, by the one or more processors, the shared memory among one or more current execution threads currently using the shared memory and the requesting execution thread, wherein:

said redistributing is performed as a function of $M_{TH}$, $M_R$, $M_u$, and $M_c$, $M_u$ is a total amount of the shared memory currently being used by the one or more current execution threads, and wherein-$M_c$ is a memory capacity of the shared memory, and said redistributing in step (c) comprises steps of:

(c1) determining whether $M_u+M_R \leq M_{TH}$, wherein in a case where $M_u+M_R \$ M_{TH}$, allocating the first requested amount $M_R$ of the shared memory to the requesting execution thread, and in a case where $M_u+M_R>M_{TH}$, then performing step (c2);

(c2) determining, based on the $M_u+M_R>M_{TH}$, whether $M_u+M_R \leq M_c$, wherein in a case where $M_u+M_R>M_c$, then setting $\Delta M=M_U+M_R-M_c$ followed by step (c5), and in a case where $M_u+M_R \leq M_c$, then performing step (c3);

(c3) determining, based on the $M_u+M_R \leq M_c$, whether the request is from a new requesting thread and $M_U+M_{min} \leq M_c$, wherein in a case where the request is from the new requesting thread and $M_u+M_{min} \leq M_c$, then performing step (c4), in a case where the requesting execution thread is the existing execution thread, setting $\Delta M=M_u+M_{MIN}-M_c$ followed by performing step (c5), and $M_{MIN}$ is a predetermined minimum amount of the shared memory;

(c4) allocating the predetermined minimum amount of shared memory $M_{MIN}$ to the requesting execution thread; and (c5) instructing, based on the determination that the requesting execution thread is the existing execution thread and the setting of $\Delta M=M_U+M_{MIN}-M_c$, N top execution threads to complete processing of, and then releasing of, a fraction (f) of the shared memory currently used ($M_N$) by the N top execution threads, wherein the N top execution threads are existing execution threads that hold a most amount of the shared memory or hold the shared memory for a longest period of time, the N top execution threads do not include the requesting execution thread, f and N are constrained to satisfy $f*M_N \geq \Delta M$, and $0<f \leq 1$ and N is a positive integer of at least 1, N is predetermined or previously specified, and said instructing comprises calculating $f=\Delta M/N$.

6. The computer program product of claim 5, said method further comprising steps of:

re-performing steps (a)-(c), after execution of steps (a)-(c), using different values of the one or more input parameters, resulting in a change in the calculated memory threshold $M_{TH}$ in re-performed step (a), wherein the request from the requesting execution thread in re-performed step (b) is replaced by a different request from a different requesting execution thread for a second requested amount ($M_R$) of the shared memory, and the redistributed shared memory has changed in re-performed step (c).

7. A computer system, comprising one or more processors, one or more memories, and one or more computer readable hardware storage devices, said one or more computer readable hardware storage devices containing program code executable by the one or more processors via the one or more memories to implement a method for dynamically allocating shared memory of the computer system among multiple execution threads via use of a memory threshold, said method comprising:

(a) executing, by the one or more processors, a trained machine learning model (MLM) to calculate a memory threshold ($M_{TH}$) of the shared memory using values of one or more input parameters as input to the MLM, wherein said MLM is previously trained based on the one or more input parameters;

(b) after said executing the MLM, receiving, by the one or more processors, a request from a requesting execution thread for a first requested amount ($M_R$) of the shared memory, wherein:

the requesting execution thread is one of a new execution thread or an existing execution thread, the existing execution thread is using a first portion of the shared memory, and the new execution thread requests for a second portion of the shared memory; and (c) in response to the request, redistributing, by the one or more processors, the shared memory among one or more current execution threads currently using the shared memory and the requesting execution thread, wherein:

said redistributing is performed as a function of $M_{TH}$, $M_R$, $M_u$, and $M_c$, $M_U$ is a total amount of the shared memory currently being used by the one or more current execution threads, $M_c$ is a memory capacity of the shared memory, and said redistributing in step (c) comprises steps of:

(c1) determining whether $M_u+M_R \leq M_{TH}$, wherein in a case where $M_u+M_R \leq M_{TH}$, allocating the first requested amount $M_R$ of the shared memory to the requesting execution thread, and in a case where $M_u+M_R > M_{TH}$, then performing step (c2);

(c2) determining, based on the $M_u+M_R > M_{TH}$, whether $M_u+M_R \leq M_c$, wherein in a case where $M_u+M_R > M_c$, then setting $\Delta M=M_U+M_R-M_c$ followed by step (c5), and in a case where $M_u+M_R \leq M_c$, then performing step (c3);

(c3) determining, based on the $M_u+M_R \leq M_c$, whether the request is from a new requesting thread and $M_u+M_{min} \leq M_c$, wherein in a case where the request is from the new requesting thread and $M_u+M_{min} \leq M_c$, then performing step (c4), in a case where the requesting execution thread is the existing execution thread, setting $\Delta M=M_U+M_{MIN}-M_c$ followed by performing step (c5), and $M_{MIN}$ is a predetermined minimum amount of the shared memory;

(c4) allocating the predetermined minimum amount of shared memory $M_{MIN}$ to the requesting execution thread; and (c5) instructing, based on the determination that the requesting execution thread is the existing execution thread and the setting of $\Delta M=M_U+M_{MIN}-M_c$, N top execution threads to complete processing of, and then releasing of, a fraction (f) of the shared memory currently used ($M_N$) by the N top execution threads, wherein the N top execution threads are existing execution threads that hold a most amount of the shared memory or hold the shared memory for a longest period of time, the N top execution threads do not include the requesting execution thread, f and N are constrained to satisfy $f*M_N \geq \Delta M$, and $0<f \leq 1$ and N is a positive integer of at least 1

N is predetermined or previously specified, and said instructing comprises calculating $f=\Delta M/N$.

8. The computer system of claim 7, said method further comprising steps of:

re-performing steps (a)-(c), after execution of steps (a)-(c), using different values of the one or more input parameters, resulting in a change in the calculated memory threshold $M_{TH}$ in re-performed step (a), wherein the request from the requesting execution thread in re-performed step (b) is replaced by a different request from a different requesting execution thread for a second requested amount ($M_R$) of the shared memory, and the redistributed shared memory has changed in re-performed step (c).

* * * * *